(12) United States Patent
Marusawa (10) Patent No.: US 11,961,645 B2
(45) Date of Patent: Apr. 16, 2024

(54) COIL COMPONENT AND METHOD FOR MANUFACTURING COIL COMPONENT

(71) Applicant: Murata Manufacturing Co., Ltd., Kyoto-fu (JP)

(72) Inventor: Hiroshi Marusawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 281 days.

(21) Appl. No.: 17/371,889

(22) Filed: Jul. 9, 2021

(65) Prior Publication Data

US 2022/0020515 A1  Jan. 20, 2022

(30) Foreign Application Priority Data

Jul. 20, 2020 (JP) ................ 2020-123791

(51) Int. Cl.
*B29D 99/00* (2010.01)
*C08G 59/42* (2006.01)
(Continued)

(52) U.S. Cl.
CPC ......... *H01F 1/14766* (2013.01); *B29D 99/00* (2013.01); *C08G 59/42* (2013.01); *C08K 3/08* (2013.01); *C08K 3/22* (2013.01); *C08K 3/36* (2013.01); *C08K 9/02* (2013.01); *H01F 41/04* (2013.01); *B29K 2063/00* (2013.01);
(Continued)

(58) Field of Classification Search
CPC ..... H01F 1/14766; H01F 41/04; B29D 99/00; B29K 2063/00; B29K 2505/00; B29K 2995/0008; C08G 59/42; C08K 3/08; C08K 3/22; C08K 3/36; C08K 9/02; C08K 2003/0856; C08K 2003/2227;
(Continued)

(56) References Cited

U.S. PATENT DOCUMENTS 9,214,263 B2 * 12/2015 Marusawa ................ H01F 1/01
2005/0007232 A1 * 1/2005 Ono .................... H01F 1/15366
336/213

(Continued)

FOREIGN PATENT DOCUMENTS

JP  2007-027354 A  2/2007
JP  2007-149757 A  6/2007
(Continued)

OTHER PUBLICATIONS

Machine translation of KR 20170115342 A to Lee et al., published Oct. 17, 2017 (Year: 2017).*

(Continued)

*Primary Examiner* — Jane L Stanley
(74) *Attorney, Agent, or Firm* — Studebaker & Brackett PC (57) ABSTRACT

A coil component is capable of suppressing permeation of liquid or gas into a magnetic portion and increasing mechanical strength of the magnetic portion. A coil component includes a magnetic portion including soft magnetic metal particles having an insulating oxide layer on a surface thereof, with the soft magnetic metal particles being bonded to each other with the insulating oxide layer interposed therebetween; and a coil portion provided inside or on the surface of the magnetic portion. A mixture containing a resin and inorganic particles is disposed between the soft magnetic metal particles.

20 Claims, 4 Drawing Sheets

(51) Int. Cl.
  *C08K 3/08*     (2006.01)
  *C08K 3/22*     (2006.01)
  *C08K 3/36*     (2006.01)
  *C08K 9/02*     (2006.01)
  *H01F 1/147*    (2006.01)
  *H01F 41/04*    (2006.01)
  *B29K 63/00*    (2006.01)
  *B29K 505/00*   (2006.01)

(52) U.S. Cl.
  CPC .. *B29K 2505/00* (2013.01); *B29K 2995/0008* (2013.01); *C08K 2003/0856* (2013.01); *C08K 2003/2227* (2013.01); *C08K 2003/2265* (2013.01); *C08K 2201/005* (2013.01); *C08K 2201/01* (2013.01)

(58) Field of Classification Search
  CPC ...... C08K 2003/2265; C08K 2201/005; C08K 2201/01

See application file for complete search history.

(56) References Cited

U.S. PATENT DOCUMENTS

| | | | |
|---|---|---|---|
| 2015/0099115 A1* | 4/2015 | Maeda | H01F 27/255 |
| | | | 252/62.53 |
| 2019/0287715 A1* | 9/2019 | Igarashi | H01F 27/2823 |
| 2020/0051720 A1* | 2/2020 | Li | H01F 1/24 |
| 2021/0050132 A1* | 2/2021 | Kodama | H01F 1/33 |
| 2021/0241968 A1* | 8/2021 | Wakabayashi | H01F 17/04 |
| 2022/0208445 A1* | 6/2022 | Yoshida | H01F 41/0246 |
| 2022/0262563 A1* | 8/2022 | Arai | H01F 1/26 |

FOREIGN PATENT DOCUMENTS

| | | | | |
|---|---|---|---|---|
| JP | 2009044068 A * | 2/2009 | | H01F 27/02 |
| JP | 2011-091378 A | 5/2011 | | |
| JP | 2017-076700 A | 4/2017 | | |
| JP | 2018-098278 A | 6/2018 | | |
| KR | 20170115342 A * | 10/2017 | | H01F 3/08 |
| WO | WO 2019142727 A1 * | 7/2019 | | B22F 1/02 |

OTHER PUBLICATIONS

Machine translation of JP 2009044068 A to Ono et al. published Feb. 26, 2009 (Year: 2009).*

* cited by examiner

COIL COMPONENT AND METHOD FOR MANUFACTURING COIL COMPONENT

CROSS-REFERENCE TO RELATED APPLICATION

This application claims benefit of priority to Japanese Patent Application No. 2020-123791, filed Jul. 20, 2020, the entire content of which is incorporated herein by reference.

BACKGROUND

Technical Field

The present disclosure relates to a coil component and a method for manufacturing a coil component.

Background Art

Japanese Patent Application Laid-Open No. 2017-76700 discloses a coil component including: a rectangular parallelepiped magnetic portion made of a magnetic material; a coil portion made of a conductive material, and including an oval inner peripheral edge portion wound around one axis inside the magnetic portion and having a long axis in a long side direction of the magnetic portion when viewed from the one axis direction; and a pair of external electrodes provided on the magnetic portion and electrically connected to the coil portion.

SUMMARY

Japanese Patent Application Laid-Open No. 2017-76700 discloses that the magnetic portion may include a resin material impregnated between (or in a gap between) the magnetic materials. It is said that this resin has advantages such as an increase in strength and suppression of hygroscopicity, and moisture is less likely to enter the inside of the magnetic portion, so that deterioration of insulation properties can be suppressed particularly under high humidity. It is also said that, as another effect, when plating is used for forming an external electrode, plating elongation can be suppressed.

As described above, since the void portion in the magnetic portion constituting the coil component is filled with the resin material, the penetration of liquid such as moisture or a plating solution or corrosive gas such as sulfur oxide (SOx) into the magnetic portion is suppressed, whereby the reliability of the coil component can be improved, and the mechanical strength of the magnetic portion is increased, whereby the strength of the coil component can be improved. In the coil component, however, further improvement in the reliability and the strength is desired.

Accordingly, the present disclosure provides a coil component capable of suppressing permeation of liquid or gas into a magnetic portion and increasing mechanical strength of the magnetic portion. Further, an object of the present disclosure is to provide a method for manufacturing the coil component.

A coil component of the present disclosure includes a magnetic portion including soft magnetic metal particles having an insulating oxide layer on a surface thereof, with the soft magnetic metal particles being bonded to each other with the insulating oxide layer interposed therebetween; and a coil portion provided inside or on a surface of the magnetic portion. Also, a mixture containing a resin and inorganic particles is disposed between the soft magnetic metal particles.

A method for manufacturing a coil component of the present disclosure includes a step of preparing a magnetic portion including soft magnetic metal particles having an insulating oxide layer on a surface thereof, with the soft magnetic metal particles being bonded to each other with the insulating oxide layer interposed therebetween; a step of forming a coil portion inside or on a surface of the magnetic portion; a step of filling a void portion in the magnetic portion with a mixture containing a resin and inorganic particles; and a step of curing the resin. The resin contained in the mixture is a resin composition containing a liquid epoxy resin and a liquid acid anhydride, or a resin composition containing a resin obtained by dissolving a solid epoxy resin in a solvent to form a varnish and a liquid acid anhydride.

According to the present disclosure, it is possible to provide a coil component capable of suppressing the permeation of liquid or gas into a magnetic portion and increasing the mechanical strength of the magnetic portion.

DETAILED DESCRIPTION

Hereinafter, a coil component and a method for manufacturing the coil component of the present disclosure will be described. The present disclosure, however, is not limited to the following constitutions, and can be appropriately modified and applied without departing from the sprit and scope of the present disclosure. Combinations of two or more of the individual desirable constitutions of the disclosure described below are also encompassed in the disclosure.

[Coil Component]

Figure 1:
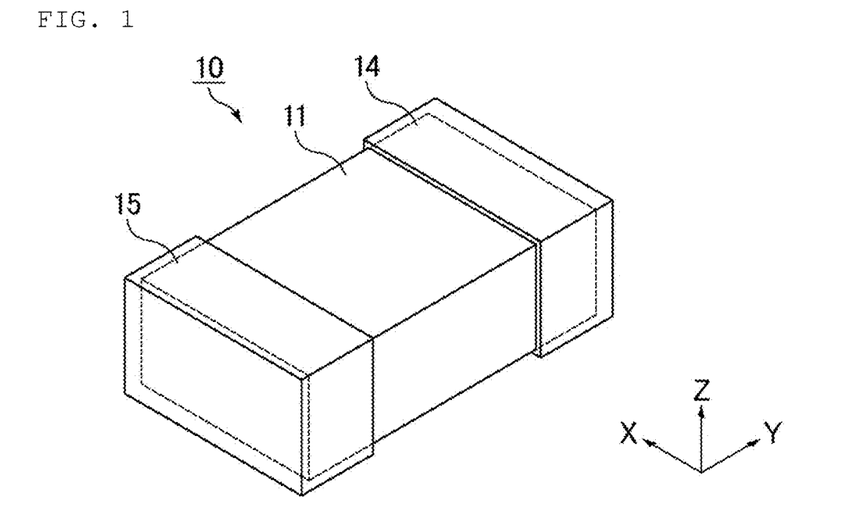
FIG. 1 is a perspective view schematically illustrating a coil component according to one embodiment of the present disclosure.
Figure 2:
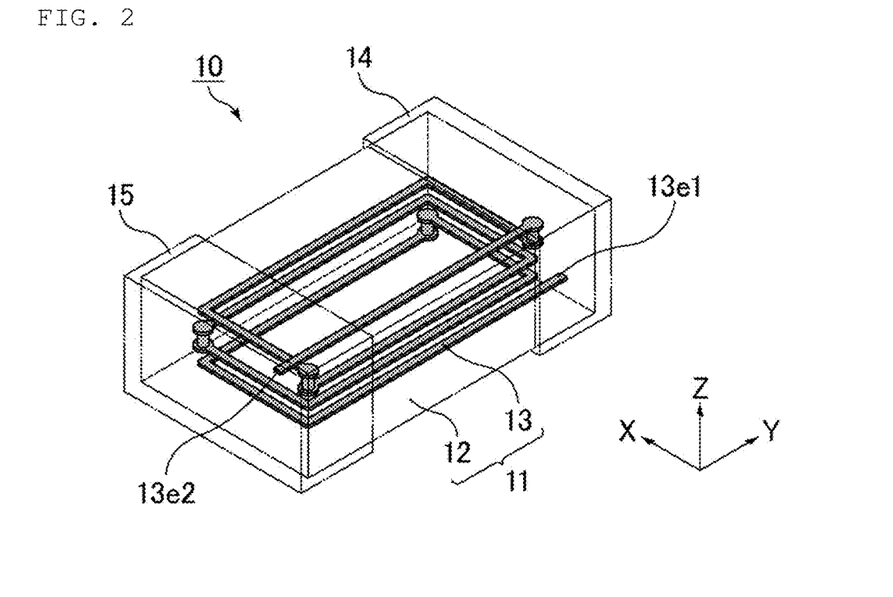
FIG. 2 is a perspective view schematically illustrating one example of an internal structure of the coil component illustrated in FIG. 1.

FIG. 1 is a perspective view schematically illustrating a coil component according to one embodiment of the present disclosure. FIG. 2 is a perspective view schematically illustrating one example of an internal structure of the coil component illustrated in FIG. 1.

A coil component 10 illustrated in FIG. 1 is constituted as a laminated inductor having a laminated structure. The coil component 10 includes a main body portion 11, a first external electrode 14, and a second external electrode 15.

The coil component 10 is formed in, for example, a rectangular parallelepiped shape having a width in the X-axis direction, a length in the Y-axis direction, and a height in the Z-axis direction.

The first external electrode 14 covers one end surface in the Y-axis direction of the main body portion 11, and extends in the Y-axis direction along four surfaces connected to the end surface. The second external electrode 15 covers the other end surface in the Y-axis direction of the main body portion 11, and extends in the Y-axis direction along the four surfaces connected to the end surface. The first external electrode 14 and the second external electrode 15 are formed of a conductive material, and constitute a pair of terminals of the coil component 10.

The main body portion 11 includes a magnetic portion 12 and a coil portion 13. The magnetic portion 12 forms an outer shape of the main body portion 11. The coil portion 13 is formed of a conductive material in a spiral shape and is disposed inside the magnetic portion 12. The coil portion 13 has a first extended end part 13e1 extended to the first external electrode 14 and a second extended end part 13e2 extended to the second external electrode 15.

Figure 3:
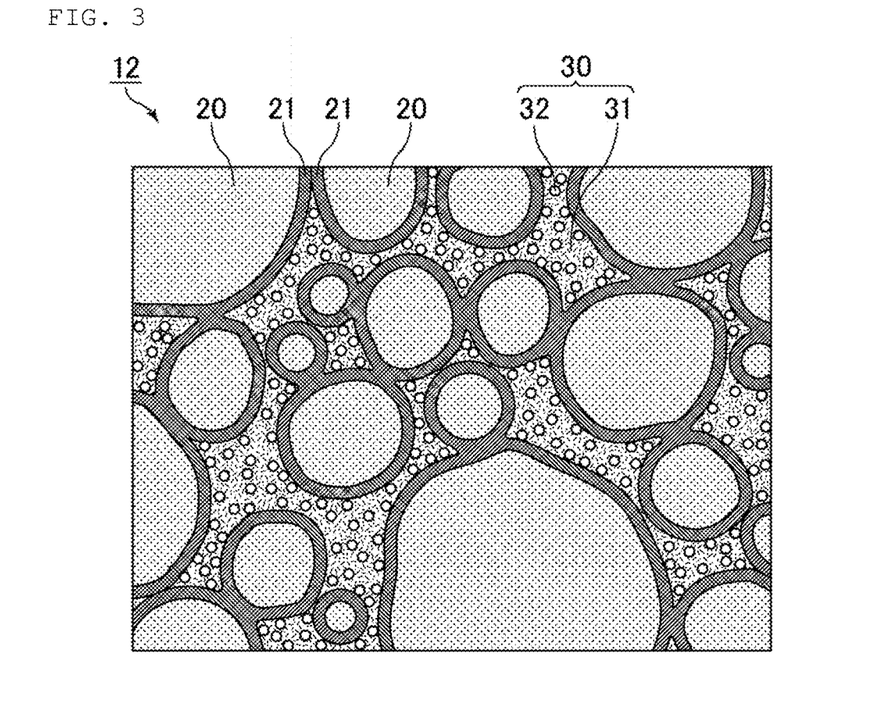
FIG. 3 is an enlarged sectional view schematically illustrating one example of a magnetic portion constituting the coil component illustrated in FIG. 1.

FIG. 3 is an enlarged sectional view schematically illustrating one example of the magnetic portion constituting the coil component illustrated in FIG. 1. The magnetic portion 12 is constituted as an aggregate of the soft magnetic metal particles 20. The soft magnetic metal particles 20 have an insulating oxide layer 21 formed on the surface thereof. The soft magnetic metal particles 20 are bonded to each other with the insulating oxide layer 21 interposed therebetween. In the example shown in FIG. 3, the entire surface of the soft magnetic metal particles 20 is covered with the insulating oxide layer 21. However, parts covered with no insulating oxide layer 21 may be present on a part of the surface of the soft magnetic metal particles 20. Even if there are parts covered with no insulating oxide layer 21 on a part of the surface of the soft magnetic metal particles 20, the insulating property is secured by a mixture 30 containing a resin 31 and inorganic particles 32 described later.

The soft magnetic metal particles 20 are, for example, Fe—Si-type Fe-based alloy particles. The soft magnetic metal particles 20 may be particles of an Fe—Si—Cr-type Fe-based alloy, an Fe—Si—Al-type Fe-based alloy, an Fe—Cr—Al-type Fe-based alloy, Fe, or an Fe—Co alloy.

The soft magnetic metal particles 20 have an average particle size of, for example, 1 µm or more and 100 µm or less (i.e., from 1 µm to 100 µm). The average particle size of the soft magnetic metal particles 20 is more preferably 5 µm or more and 50 µm or less (i.e., from 5 µm to 50 µm).

The average particle size of the soft magnetic metal particles 20 refers to an average particle size of equivalent circle diameters of soft magnetic metal particles 20 present in the field of view when the section of the magnetic portion 12 is observed, the particle size of each soft magnetic metal particle 20 being measured at 10 points by a line segment method. Note that the average particle size of the soft magnetic metal particles 20 as a starting material may be considered to be the same as the average particle size of the soft magnetic metal particles 20 present in the magnetic portion 12 constituting the coil component 10 as a finished product. The average particle size of the soft magnetic metal particles 20 as the starting material can be measured by a laser diffraction/scattering method, and is represented as a median diameter (D50).

The insulating oxide layer 21 is made of, for example, a ceramic oxide such as ZnO. The insulating oxide layer 21 may be made of glass such as borosilicate glass or soda lime glass.

The mixture 30 containing the resin 31 and the inorganic particles 32 is disposed between the soft magnetic metal particles 20.

By filling spaces between the soft magnetic metal particles 20, that is, void portions in the magnetic portion 12 with the inorganic particles 32 in addition to the resin 31, the permeation of liquid such as moisture or a plating solution or corrosive gas such as SOx into the magnetic portion is further suppressed as compared with a case where only the resin 31 is filled. As a result, the reliability of the coil component 10 can be improved.

Furthermore, the elastic modulus of the magnetic portion 12 is increased by filling the mixture 30 containing the resin 31 and the inorganic particles 32 between the soft magnetic metal particles 20, and thus the mechanical strength against external stress is increased. As a result, the strength of the coil component 10 can be improved.

The resin 31 is desirably a thermosetting resin. Examples of the thermosetting resin include epoxy resins and polyimide resins. Polypropylene and polystyrene, which are typical thermoplastic resins, cannot be liquefied unless they are heated and melted at 168° C. and at 100° C., respectively. In addition, if the resin can be liquefied and filled into the void portions in the magnetic portion 12, there is the risk in which the filled resin may flow out at the temperature described above. On the other hand, since epoxy resins, which are typical thermosetting resins, are liquid at room temperature, if a curing treatment is performed after filling the resin, the filled resin does not flow out if a heating treatment such as solder reflow is performed.

Among them, the resin 31 is desirably a cured product of a resin composition containing a liquid epoxy resin and a liquid acid anhydride. By using the resin composition containing the liquid epoxy resin and the liquid acid anhydride as the resin 31, the viscosity of the resin composition can be reduced, and thus the filling rate of the resin into the void portions in the magnetic portion 12 can be increased. In addition, as the viscosity of the resin composition is decreased, the amount of the inorganic particles 32 contained in the resin composition can be increased, and thus the amount of the inorganic particles 32 that can be filled in the void portions in the magnetic portion 12 can be increased. Instead of the liquid epoxy resin, a resin obtained by dissolving a solid epoxy resin in a solvent to form a varnish can also be used. It is also desirable, accordingly, that the resin 31 is a cured product of a resin composition containing the resin obtained by dissolving a solid epoxy resin in a solvent to form a varnish and the liquid acid anhydride.

The liquid epoxy resin refers to an epoxy resin which is liquid at 25° C., and the liquid acid anhydride refers to an acid anhydride which is liquid at 25° C. Examples of the liquid epoxy resin, as the main agent, include bisphenol A type epoxy resins and bisphenol F type epoxy resins. Examples of the liquid acid anhydride, as a curing agent, include aromatic acid anhydrides such as phthalic anhydride, pyromellitic anhydride, and trimellitic anhydride; cyclic aliphatic acid anhydrides such as tetrahydrophthalic anhydride, methyl tetrahydrophthalic anhydride, hexahydrophthalic anhydride, methyl hexahydrophthalic anhydride, and methylnadic anhydride; and aliphatic acid anhydrides such as succinic anhydride, polyadipic anhydride, polysebacic anhydride, and polyazelaic anhydride. The solid epoxy resin refers to an epoxy resin that is solid at 25° C.

The inorganic particles 32 may be magnetic particles. Alternatively, the inorganic particles 32 may be silica particles or alumina particles. The inorganic particles 32 may include at least one kind of the magnetic particles, the silica particles, and the alumina particles.

The shape of the inorganic particles 32 is desirably spherical. The spherical shape includes not only a perfect spherical shape but also a shape close to a spherical shape. The mixture 30 may contain only the spherical inorganic particles 32, or may contain, in addition to the spherical inorganic particles 32, inorganic particles 32 having a shape other than a spherical shape, for example, a flat shape.

When the inorganic particles 32 are magnetic particles, the magnetic particles may be metal magnetic particles or ferrite particles. The magnetic particles may contain both metal magnetic particles and ferrite particles.

In a case where the void portions in the magnetic portion 12 are filled with only a nonmagnetic material such as a resin material, those parts form nonmagnetic regions, whereby the magnetic flux is divided. Consequently, the magnetic flux is concentrated at positions where the soft magnetic metal particles 20 are brought into point contact with each other with the insulating oxide layer 21 interposed therebetween, and thus a structure in which magnetic saturation easily occurs is obtained. Therefore, the resin material containing the magnetic particles is filled in the void portions in the magnetic portion 12, whereby the magnetic properties of the coil component 10 can be improved. Specifically, when the magnetic particles are metal magnetic particles, DC superposition characteristics can be improved due to high saturation magnetization, and when the magnetic particles are ferrite particles, high frequency magnetic permeability characteristics can be improved due to high resistance.

When the inorganic particles 32 are magnetic particles, the average particle size of the magnetic particles is desirably smaller than that of the soft magnetic metal particles 20. Specifically, the average particle size of the magnetic particles is desirably 1 μm or less, more desirably 500 nm or less, and still more desirably 100 nm or less. When the average particle size of the magnetic particles is set to 1 μm or less, the filling rate of the particles in the void portions in the magnetic portion 12 can be increased, and a magnetic domain structure close to that of a single magnetic domain particle can be obtained, whereby magnetic characteristics excellent in high frequency characteristics can be obtained. On the other hand, when the average particle size of the magnetic particles is less than that of the single magnetic domain particles, magnetism is lost, and when the average particle size of the magnetic particles is too small, it is difficult to handle them. For those reasons, the average particle size of the magnetic particles is desirably 10 nm or more.

The average particle size of the magnetic particles can be measured by the same method as the method for measuring the average particle size of the soft magnetic metal particles 20 described above.

When the magnetic particles are metal magnetic particles, the metal magnetic particles are desirably metal particles containing at least one element selected from the group consisting of Si, Cr, Al, Ni and Co, and an Fe element. Specifically, the metal magnetic particles are desirably carbonyl iron particles, Fe-type, Fe—Si-type, Fe—Si—Cr-type, or Fe—Co-type Fe-based crystalline particles, or Fe—Si—B-type or Fe—Si—B—Cr-type Fe-based amorphous particles. These metal magnetic particles may be one kind or two or more kinds. When these metal magnetic particles are used, it is possible to contribute to improvement of the inductance value (L value) of the coil component 10, particularly improvement of the L value in a high frequency range without deteriorating the DC superposition characteristics.

When the magnetic particles are the ferrite particles, the ferrite particles are desirably particles of magnetite (iron ferrite), manganese ferrite, magnesium ferrite, strontium ferrite, nickel zinc ferrite, nickel ferrite, or cobalt ferrite. These ferrite particles may be one kind or two or more kinds thereof. When these ferrite particles are used, the DC superposition characteristics of the coil component 10 tends to be deteriorated, but the L value can be efficiently improved.

In a case where the inorganic particles 32 are the silica particles, the linear expansion coefficient of the filled parts can be reduced as compared with a case where only the resin material is filled in the void portions in the magnetic portion 12, and thus the internal stress of the magnetic portion 12 can be reduced. As a result, the long-term reliability of the coil component 10 can be improved.

When the inorganic particles 32 are the alumina particles, as with silica particles, the linear expansion coefficient of the filled parts can be reduced as compared with the case where only the resin material is filled in the void portions in the magnetic portion 12, and thus the internal stress of the magnetic portion 12 can be reduced. Furthermore, it is possible to improve the heat dissipation of heat generated by application of a current to the coil component 10.

The inorganic particles 32 may contain both of the silica particles and the alumina particles.

When the inorganic particles 32 are the silica particles or the alumina particles, the average particle size of the silica particles or alumina particles is desirably smaller than that of the soft magnetic metal particles 20. Specifically, the average particle size of the silica particles or the alumina particles is desirably 1 μm or less, more desirably 500 nm or less, and still more desirably 100 nm or less. The filling rate of the particles in the void portions in the magnetic portion 12 can be increased by setting the average particle size of the silica particles or the alumina particles to 1 μm or less. On the other hand, when the average particle size of the silica particles or the alumina particles is too small, it is difficult to uniformly disperse the inorganic particles in the resin, and it is also difficult to highly fill the inorganic particles in the resin, and consequently it is difficult to obtain the effects of the silica particles or the alumina particles. For those reasons, the average particle size of the silica particles or the alumina particles is desirably 10 nm or more.

The average particle size of the silica particles or the alumina particles can be measured by the same method as the method for measuring the average particle size of the soft magnetic metal particles 20 described above.

Figure 4:
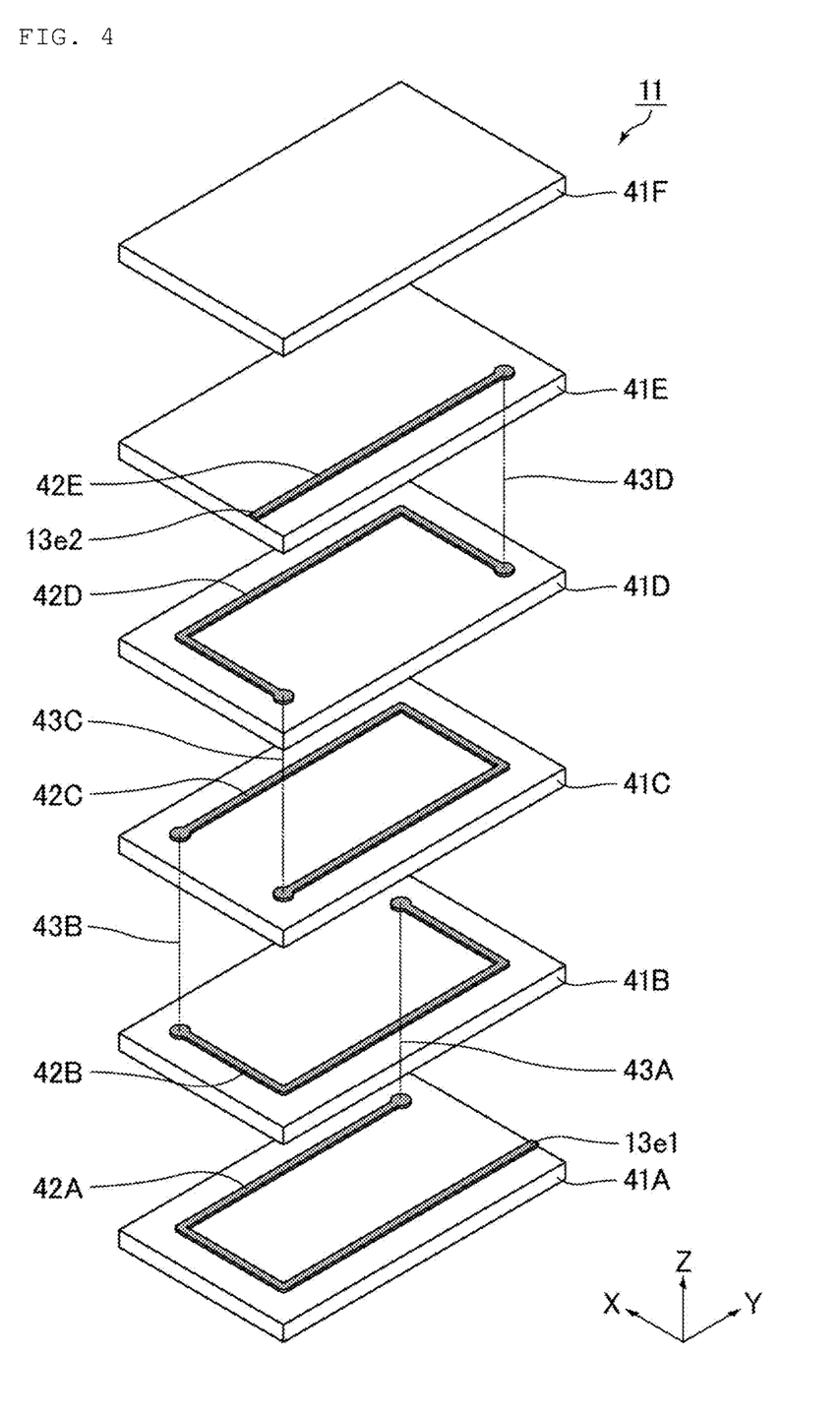
FIG. 4 is an exploded perspective view schematically illustrating one example of a main body portion constituting the coil component illustrated in FIG. 1.

FIG. 4 is an exploded perspective view schematically illustrating one example of a main body portion constituting the coil component illustrated in FIG. 1. As illustrated in FIG. 4, the main body portion 11 includes integrated soft magnetic metal layers 41A, 41B, 41C, 41D, 41E, and 41F laminated in the Z-axis direction. The magnetic portion 12 (see FIG. 2) is formed of the soft magnetic metal layers 41A, 41B, 41C, 41D, 41E, and 41F.

Conductor patterns 42A, 42B, 42C, 42D, and 42E having predetermined shapes are formed on the surfaces of the soft magnetic metal layers 41A, 41B, 41C, 41D, and 41E, respectively. The first extended end part 13e1 is formed at one end of the conductor pattern 42A on the soft magnetic metal layer 41A, and the second extended end part 13e2 is formed at one end of the conductor pattern 42E on the soft magnetic metal layer 41E. On the other hand, no conductor pattern is formed on the surface of the soft magnetic metal layer 41F.

Furthermore, through-hole conductors 43A, 43B, 43C, and 43D penetrating the soft magnetic metal layers 41B, 41C, 41D, and 41E in the Z-axis direction are formed in the soft magnetic metal layers 41B, 41C, 41D, and 41E, respectively. The conductor patterns 42A, 42B, 42C, 42D, and 42E are connected to each other with the through-hole conductors 43A, 43B, 43C, and 43D, whereby the coil portion 13 (see FIG. 2) extending spirally in the Z-axis direction is formed.

Note that the constitution of the coil portion 13 is not limited to the constitution illustrated in FIGS. 2 and 4. For example, the number of windings of the coil portion 13 can be arbitrarily changed by changing the number of layers stacked in the soft magnetic metal layer. In addition, the shape of the coil portion 13 viewed from the lamination direction is not limited to the rectangular shape, and may be, for example, a circular shape, an elliptical shape, a polygonal shape, or the like.

[Method for Manufacturing Coil Component]

The method for manufacturing the coil component of the present disclosure includes a step of preparing a magnetic portion including soft magnetic metal particles having an insulating oxide layer on a surface thereof, with the soft magnetic metal particles being bonded to each other with the insulating oxide layer interposed therebetween; a step of forming a coil portion inside or on a surface of the magnetic portion; a step of filling a void portion in the magnetic portion with a mixture containing a resin and inorganic particles; and curing the resin.

Hereinafter, an example of the method for manufacturing the coil component 10 illustrated in FIG. 1 will be described. In the case of manufacturing the coil component 10, the main body portion 11 is manufactured by simultaneously performing the step of manufacturing the magnetic portion 12 and the step of forming the coil portion 13.

Specifically, the soft magnetic metal layers 41A to 41F (see FIG. 4) constituting the magnetic portion 12 (see FIG. 2), and the conductor patterns 42A to 42E and the through-hole conductors 43A to 43D (see FIG. 4) constituting the coil portion 13 (see FIG. 2) are formed.

The soft magnetic metal layers 41A to 41F are formed, for example, by a method such as printing using a soft magnetic metal paste which contains the soft magnetic metal particles 20 such as an Fe—Si-type Fe-based alloy powder having an average particle size of 12 μm as a main component, contains a ceramic oxide such as ZnO as the insulating oxide layer 21 used for joining the particles, and is obtained by mixing them with a binder such as polyvinyl alcohol or ethyl cellulose and a solvent such as terpineol or butyl carbitol.

As the soft magnetic metal particles 20, instead of the Fe—Si-type Fe-based alloy powder, an Fe—Si—Cr-type Fe-based alloy powder, an Fe—Si—Al-type Fe-based alloy powder, an Fe—Cr—Al-type Fe-based alloy powder, an Fe powder, or an Fe—Co alloy powder may be used.

As a bonding agent for the soft magnetic metal particles 20, forming the insulating oxide layer 21, instead of the ceramic oxide such as ZnO, glass powder such as borosilicate glass or soda lime glass may be used.

The conductor patterns 42A to 42E and the through-hole conductors 43A to 43D are formed, for example, by a method such as printing using a conductor paste in which silver, silver-type, gold, gold-type, copper, or copper-type conductive metal powder is mixed with a binder such as polyvinyl alcohol or ethyl cellulose and a solvent such as terpineol or butyl carbitol.

As an example, the conductor pattern 42A is formed on the surface of the soft magnetic metal layer 41A. The conductor pattern 42A corresponds to less than one turn. One end of the conductor pattern 42A is extended to the end surface of the soft magnetic metal layer 41A, and the other end is connected to one end of the conductor pattern 42B formed on the upper soft magnetic metal layer 41B with the through-hole conductor 43A interposed therewith. The conductor patterns 42C, 42D, and 42E formed on the further upper soft magnetic metal layers 41C, 41D, and 41E are also connected with the through-hole conductors 43B, 43C, and 43D interposed therewith, respectively, in the same manner as above. One end of the conductor pattern 42E is extended to an end surface which is opposite to that of the conductor pattern 42A.

The soft magnetic metal layer 41A to 41E on which the conductor patterns 42A to 42E are formed and the soft magnetic metal layer 41F on which no conductor pattern is formed are subjected to lamination printing to prepare a laminate, and then, for example, a thermal decomposition treatment of the binder is performed at 400° C. or lower in an oxygen atmosphere. Thereafter, for example, firing is performed at a high temperature of 900° C. in a low oxygen atmosphere to form an insulating oxide layer containing ZnO or the like on the surface of the soft magnetic metal particles, and, at the same time, the soft magnetic metal particles are bonded to each other with the insulating oxide layer interposed therebetween, thereby manufacturing the main body portion 11 including the magnetic portion 12 and the coil portion 13. The first external electrode 14 and the second external electrode 15 are formed on both end surfaces of the main body portion 11 after the firing. Note that the surface of the soft magnetic metal particles may be oxidized to form the insulating oxide layer by subjecting the binder to a thermal decomposition treatment under an oxidizing atmosphere without using the ceramic oxide such as ZnO or the glass powder such as the borosilicate glass or the soda lime glass as the bonding agent. The soft magnetic metal particles can be bonded to each other with the insulating oxide layer interposed therebetween, for example, by firing the soft magnetic metal particles at a high temperature of 1000° C. in a low oxygen atmosphere.

The above manufacturing method is a manufacturing method by the lamination-printing using the soft magnetic metal paste and the conductor paste, but the manufacturing can also be performed by a method in which a soft magnetic metal sheet is prepared, a conductor paste is printed on the surface of the soft magnetic metal sheet, the sheets are stacked, the resulting product is pressed with a pressure press to form a laminate and cut into chips, and firing is performed at a high temperature, for example, at 900° C. in a low oxygen atmosphere.

Thereafter, the void portions in the magnetic portion 12 are filled with the mixture 30 containing the resin 31 and the inorganic particles 32.

In the magnetic portion 12 after the firing, there are the void portions between the soft magnetic metal particles 20. The surfaces, at which the soft magnetic metal particles 20 are brought into point contact with each other, are bonded to each other only by glass bonding, solid solution generation, or the like with the glass such as the borosilicate glass or the soda lime glass or the ceramic oxide such as ZnO, and thus the mechanical strength is low. As described above, by filling the void portions in the magnetic portion 12 with the mixture 30 containing the resin 31 and the inorganic particles 32, the reliability and mechanical strength of the magnetic portion 12 can be improved.

As the resin 31 and the inorganic particles 32 contained in the mixture 30, those described above can be used. However, in the step of filling the void portions in the magnetic portion 12 with the mixture 30, the resin 31 is in a state before curing.

As the resin 31 contained in the mixture 30, it is desirable to use a thermosetting resin, and more desirably to use a resin composition containing a liquid epoxy resin and a liquid acid anhydride, or a resin composition containing a resin obtained by dissolving a solid epoxy resin in a solvent to form a vanish and a liquid acid anhydride.

For example, the void portions in the magnetic portion 12 are vacuum-impregnated with a thermosetting resin such as an epoxy resin as the resin 31. A bisphenol A type epoxy resin or a bisphenol F type epoxy resin is used as a main agent of the thermosetting resin, and an acid anhydride having a phthalic anhydride backbone is used as a curing agent. In the main agent, Mn-type ferrite particles having an average particle size of 90 nm is highly dispersed as the inorganic particles 32. After the main agent and the curing agent are mixed in an equivalent amount, the mixture 30 is vacuum-filled into the void portions in the magnetic portion 12.

As the inorganic particles 32 contained in the mixture 30, instead of the Mn-type ferrite nanofiller, magnetic particles such as metal magnetic particles (metal powder containing at least one element selected from the group consisting of Si, Cr, Al, Ni and Co, and an Fe element, for example, carbonyl iron powder, Fe-type, Fe—Si-type, Fe—Si—Cr-type, or Fe—Co-type Fe-based crystalline particles, or Fe—Si—B-type or Fe—Si—B—Cr-type Fe-based amorphous powder) or ferrite particles (particles of magnetite (iron ferrite), manganese ferrite, magnesium ferrite, strontium ferrite, nickel zinc ferrite, nickel ferrite or cobalt ferrite), silica particles, alumina particles, or the like may be used. According to the above method, the void portions in the magnetic portion 12 can be easily filled.

After the void portions in the magnetic portion 12 are filled with the mixture 30, the resin 31 is cured. For example, when the thermosetting resin is used as the resin 31 contained in the mixture 30, the thermosetting resin in the filled portions is cured by heating it at 150° C. for 2 hours in an oven. Thus, the coil component 10 is manufactured.

Although the embodiments of the coil component of the present disclosure have been described above, the coil component of the present disclosure is not limited to the above-described embodiments, and various applications and modifications can be made within the scope of the present disclosure.

For example, the coil component 10 is not limited to the above constitution as long as the first external electrode 14 is connected to the first extended end part 13e1 and the second external electrode 15 is connected to the second extended end part 13e2. As one example, the first external electrode 14 and the second external electrode 15 are not provided on both end surfaces in the Y-axis direction of the main body portion 11, but may be provided on both end surfaces in the X-axis direction. The shapes of the first external electrode 14 and the second external electrode 15 are not particularly limited.

Figure 5:
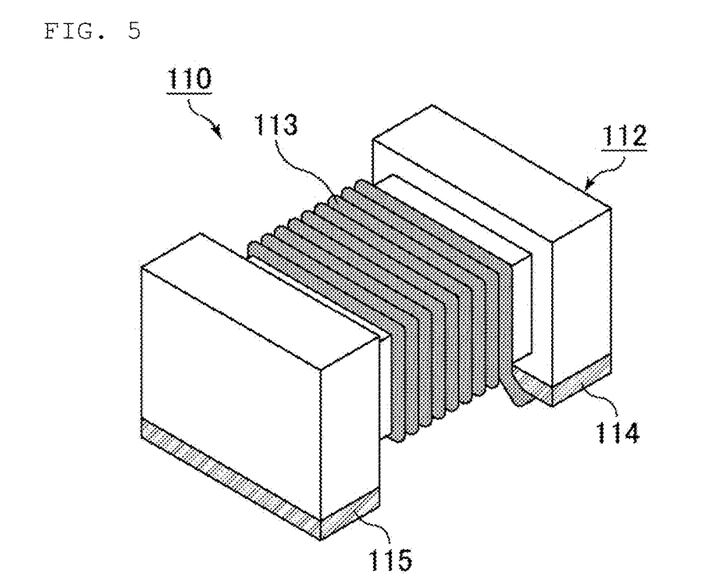
FIG. 5 is a perspective view schematically illustrating a coil component according to another embodiment of the present disclosure.

FIG. 5 is a perspective view schematically illustrating a coil component according to another embodiment of the present disclosure. In the coil component 110 illustrated in FIG. 5, a conductive wire is wound around a surface of a magnetic portion 112 to form a coil portion 113, and a first external electrode 114 and a second external electrode 115 are provided at both ends of the coil portion 113. Such a wound coil component is also included in the coil component of the present disclosure.

What is claimed is:

1. A coil component comprising:
a magnetic portion including soft magnetic metal particles having an insulating oxide layer on a surface thereof, the soft magnetic metal particles being bonded to each other with the insulating oxide layer interposed therebetween;
a coil portion provided inside or on a surface of the magnetic portion; and
a mixture containing a resin and inorganic particles disposed among the soft magnetic metal particles,
wherein the insulating oxide layer is formed of ZnO, borosilicate glass or soda lime.
2. The coil component according to claim 1, wherein the inorganic particles are magnetic particles.
3. The coil component according to claim 2, wherein the magnetic particles have an average particle size of 1 μm or less.
4. The coil component according to claim 2, wherein the magnetic particles are metal magnetic particles.
5. The coil component according to claim 4, wherein the metal magnetic particles are metal particles comprising an Fe element, and at least one element selected from the group consisting of Si, Cr, Al, Ni and Co.
6. The coil component according to claim 4, wherein the metal magnetic particles are Fe-based crystalline particles comprising at least one selected from the group consisting of Fe-type, Fe—Si-type, Fe—Si—Cr-type, and Fe—Co-type, or are Fe-based amorphous particles comprising at least one selected from the group consisting of Fe—Si—B-type and Fe—Si—B—Cr-type.
7. The coil component according to claim 2, wherein the magnetic particles are ferrite particles.
8. The coil component according to claim 7, wherein the ferrite particles comprise at least one selected from the group consisting of magnetite, manganese ferrite, magnesium ferrite, strontium ferrite, nickel zinc ferrite, nickel ferrite, and cobalt ferrite.
9. The coil component according to claim 1, wherein the inorganic particles are silica particles or alumina particles.
10. The coil component according to claim 9, wherein the silica particles or the alumina particles have an average particle size of 1 μm or less.
11. The coil component according to claim 1, wherein the resin is a thermosetting resin.
12. The coil component according to claim 1, wherein the resin is a cured product of a resin composition containing a liquid epoxy resin and a liquid acid anhydride, or a cured product of a resin composition containing a resin obtained by dissolving a solid epoxy resin in a solvent to form a varnish, and a liquid acid anhydride.
13. The coil component according to claim 3, wherein the magnetic particles are metal magnetic particles.
14. The coil component according to claim 3, wherein the magnetic particles are ferrite particles.
15. The coil component according to claim 2, wherein the resin is a thermosetting resin.
16. The coil component according to claim 3, wherein the resin is a thermosetting resin.
17. The coil component according to claim 4, wherein the resin is a thermosetting resin.
18. The coil component according to claim 2, wherein the resin is a cured product of a resin composition containing a liquid epoxy resin and a liquid acid anhydride, or a cured product of a resin composition containing a resin obtained by dissolving a solid epoxy resin in a solvent to form a varnish, and a liquid acid anhydride.

19. The coil component according to claim 3, wherein the resin is a cured product of a resin composition containing a liquid epoxy resin and a liquid acid anhydride, or a cured product of a resin composition containing a resin obtained by dissolving a solid epoxy resin in a solvent to form a varnish, and a liquid acid anhydride.

20. A method for manufacturing a coil component comprising:
   forming a coil portion inside or on a surface of a magnetic portion, the magnetic portion including a void portion, and soft magnetic metal particles having an insulating oxide layer on a surface thereof, the soft magnetic metal particles being bonded to each other with the insulating oxide layer interposed therebetween;
   filling the void portion in the magnetic portion with a mixture containing a resin and inorganic particles; and
   curing the resin,
   wherein the resin contained in the mixture being a resin composition containing a liquid epoxy resin and a liquid acid anhydride, or a resin composition containing a resin obtained by dissolving a solid epoxy resin in a solvent to form a varnish, and a liquid acid anhydride.

* * * * *